US012801484B2

(12) United States Patent
Li et al.

(10) Patent No.: US 12,801,484 B2
(45) Date of Patent: Nov. 17, 2026

(54) SYSTEM AND METHOD FOR AUTOMATED MEMORY ISSUE RESOLUTION

(71) Applicant: Microsoft Technology Licensing, LLC, Redmond, WA (US)

(72) Inventors: Ze Li, Shoreline, WA (US); Murali M. Chintalapati, Bellevue, WA (US); Yigong Hu, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/828,607

(22) Filed: Sep. 9, 2024

(65) Prior Publication Data

US 2026/0072780 A1 Mar. 12, 2026

(51) Int. Cl.
*G06F 11/00* (2006.01)
*G06F 11/07* (2006.01)

(52) U.S. Cl.
CPC ........ *G06F 11/0793* (2013.01); *G06F 11/073* (2013.01); *G06F 11/079* (2013.01)

(58) Field of Classification Search
CPC ... G06F 11/0793; G06F 11/073; G06F 11/079
USPC ................................................ 714/1–57, 157
See application file for complete search history.

(56) References Cited

U.S. PATENT DOCUMENTS 8,862,933 B2 * 10/2014 Manglik ............. H04L 67/1097 714/11
9,069,737 B1 * 6/2015 Kimotho ............... G06F 11/079
11,947,406 B2 * 4/2024 Liu ........................ G06F 11/073
2006/0136530 A1 * 6/2006 Rossmann ............ G06F 11/366
2014/0195846 A1 * 7/2014 Resch ................... G06F 3/0629 714/6.22
2014/0351656 A1 * 11/2014 Moser ................... G06F 11/366 714/45
2018/0067808 A1 * 3/2018 Resch ................. G06F 11/1076
2019/0361784 A1 * 11/2019 Savanur .............. G06F 11/3034
2020/0073579 A1 * 3/2020 Slegers ................. G06F 3/0679
2022/0188207 A1 6/2022 Chen et al.
2023/0133975 A1 * 5/2023 Goslen ................ G06F 11/3037 714/47.3

(Continued)

FOREIGN PATENT DOCUMENTS

CN 111274060 A 6/2020

OTHER PUBLICATIONS

Extended European search report received for EP Application No. 25200182.1, mailed on Feb. 1, 2026, 2026, 14 pages.

(Continued)

*Primary Examiner* — Sarai E Butler

(57) ABSTRACT

A method, computer program product, and computing system for generating a list of out-of-memory errors associated with a cloud computing environment. A log associated with an out-of-memory error is identified. A process from the log associated with the out-of-memory error is identified. A memory usage pattern associated with the process is identified. A root cause for the out-of-memory error is determined in response to identifying the memory usage pattern associated with the process. A remedial action is performed on the cloud computing environment in response to determining the root cause for the out-of-memory error.

14 Claims, 4 Drawing Sheets

(56) References Cited

U.S. PATENT DOCUMENTS

2023/0134485 A1* 5/2023 Goslen ................ G06F 11/0793
714/6.11

OTHER PUBLICATIONS

Communication pursuant to Rule 69 EPC—reminder concerning payment of the designation fee and of the examination fee—and invitation pursuant to Rule 70a(1) EPC received for EP Application No. 25200182.1, mailed on Apr. 8, 2026, 2 pages.

* cited by examiner

SYSTEM AND METHOD FOR AUTOMATED MEMORY ISSUE RESOLUTION

BACKGROUND

Memory issues are challenging to diagnose and significantly impact cloud computing environment service stability, often leading to frequent crashes. Current diagnostic pipelines primarily focus on capturing the final failure symptoms to identify failures, providing insights into the direct causes of out-of-memory problems. However, complex memory issues often have root causes that are far removed from these direct symptoms. Identifying these root causes from log messages requires substantial investigation by technicians, making the process both costly and time-consuming.

For example, effective diagnosis requires analyzing system logs for key information, which is both time-consuming and complex. Considering the vast volume of logs generated daily by cloud computing environment services, implementing comprehensive analyses in a timely manner poses a significant challenge.

BRIEF DESCRIPTION OF THE DRAWINGS

Like reference symbols in the various drawings indicate like elements.

DETAILED DESCRIPTION

Figure 1:
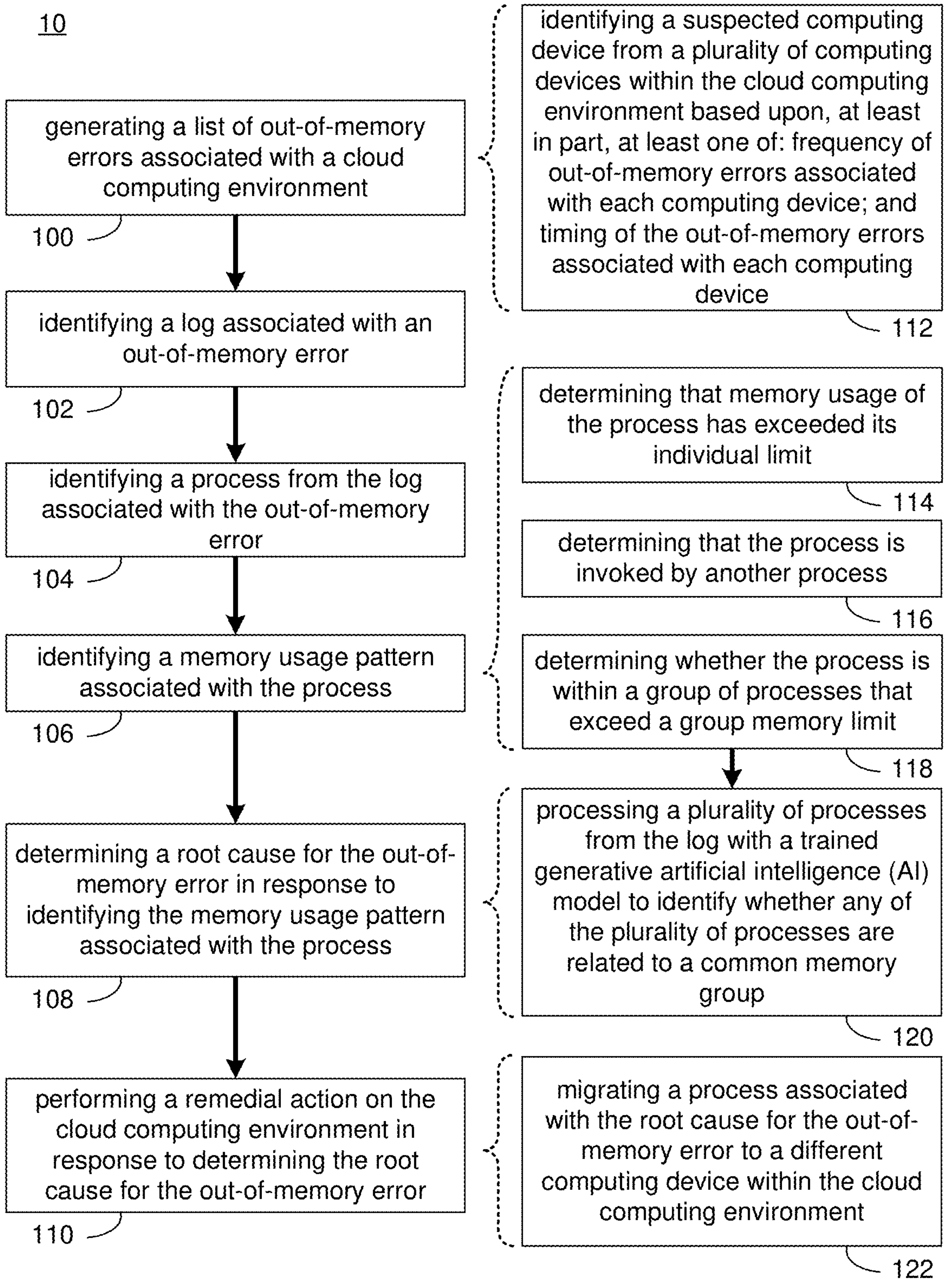
FIG. 1 is a flow chart of one implementation of an automated memory issue locating process.

Implementations of the present disclosure provide a framework designed to automate and enhance the process of locating the root causes of out-of-memory failures through log mining, thereby accelerating the diagnostic process. For example, the automated memory issue locating process involves capturing symptom-level signals to filter out irrelevant log data, followed by conducting focused analyses on a narrowed scope of log content.

As will be described in greater detail below, the automated memory issue locating process generates a list of out-of-memory errors associated with a cloud computing environment. An out-of-memory error is a state of computing device operation where no additional memory can be allocated for use by processes or the operating system. During an out-of-memory error, the computing device is unable to load any additional programs or processes, and since many processes may load additional data into memory during execution, these will cease to function correctly. A log associated with an out-of-memory error is identified. For example, the automated memory issue locating process filters logs based upon, at least in part, the frequency, the timing, and/or the "noisiness" of the error patterns from each log. A process from the log associated with the out-of-memory error is identified. For example, a process is a program or other instruction set that performs operations within a computing device. As multiple processes seek memory resources, coordinating and allocating memory can result in overallocations (i.e., out-of-memory error) or under allocations (i.e., resource wasting).

A memory usage pattern associated with the process is identified. For example, one pattern includes determining that the process is invoked by another process. Another pattern includes determining that memory usage of the process has exceeded its individual limit. In another example, a memory usage pattern associated with an out-of-memory error includes determining whether the process is within a group of processes that exceed a group memory limit. As will be discussed in greater detail below, various memory usage patterns that are indicative of a process (or a group of processes) that is responsible for an out-of-memory error. A root cause for the out-of-memory error is determined in response to identifying the memory usage pattern associated with the process. The automated memory issue locating process performs a remedial action on the cloud computing environment in response to determining the root cause for the out-of-memory error. For example, the automated memory issue locating process prevents or blocks the process(es) associated with the root cause from being executed by a computing device within the cloud computing environment. In another example, the automated memory issue locating process migrates a process associated with the root cause for the out-of-memory error to a different computing device within the cloud computing environment.

Accordingly, implementations of the present disclosure allow for the diagnosis and resolution of out-of-memory errors in hours versus the days required by conventional approaches. That is, by analyzing out-of-memory errors for sequences of particular memory usage patterns using automated memory issue locating process, the diagnosis and resolution process is reduced by (on average) eight nine percent compared to conventional approaches.

The details of one or more implementations are set forth in the accompanying drawings and the description below. Other features and advantages will become apparent from the description, the drawings, and the claims.

Figure 2:
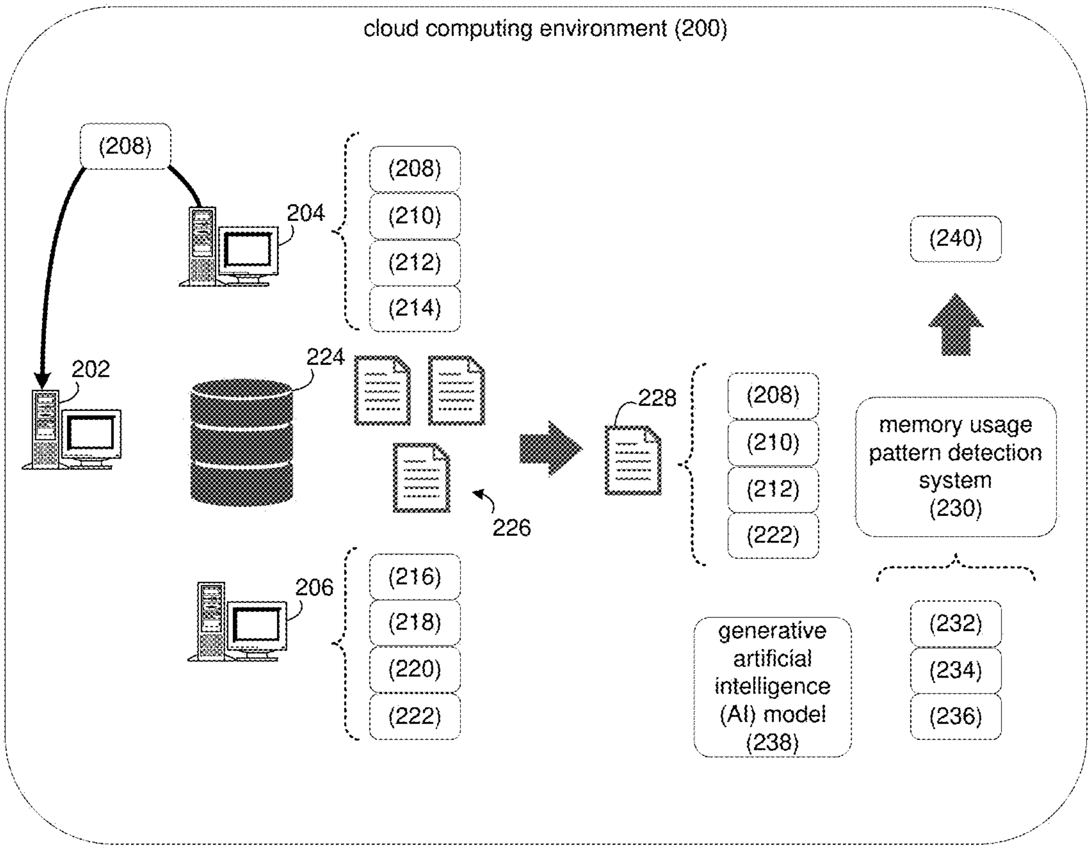
FIGS. 2-3 are diagrammatic views of the automated memory issue locating process.
Figure 3:
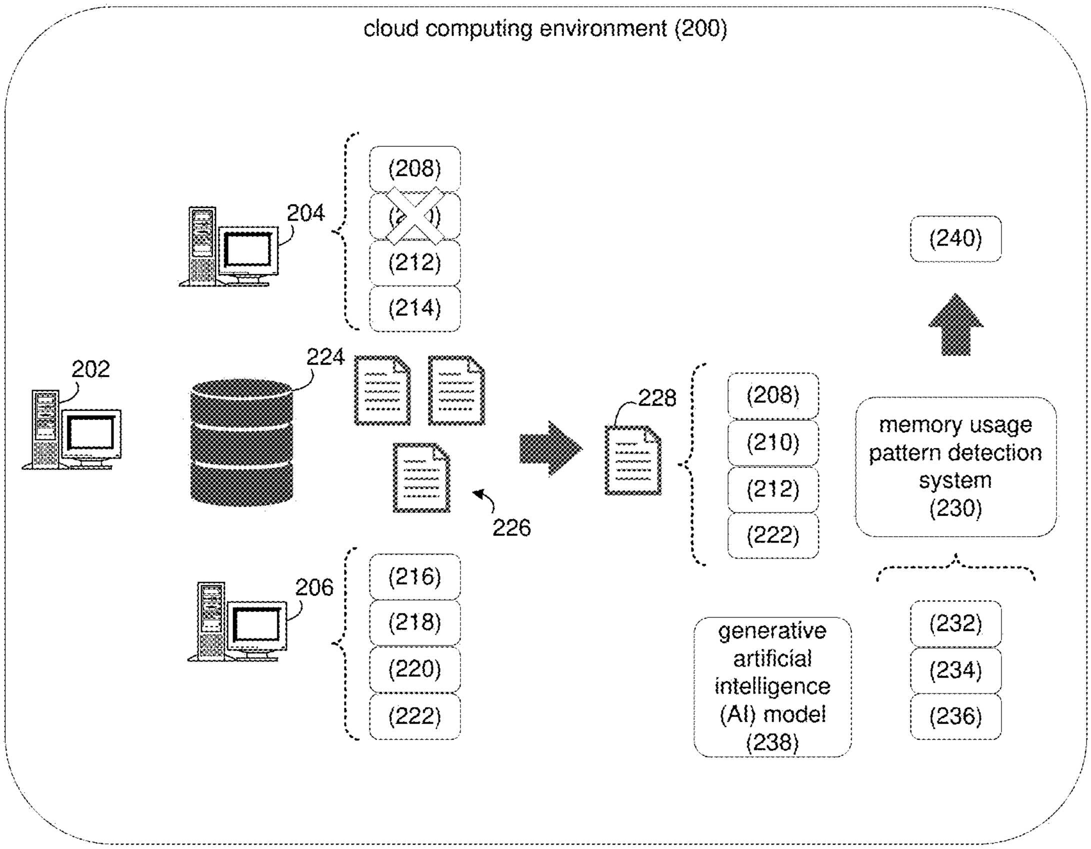

The Automated Memory Issue Locating Process:

Referring to FIGS. 1-3, automated memory issue locating process 10 generates 100 a list of out-of-memory errors associated with a cloud computing environment. A log associated with an out-of-memory error is identified 102. A process from the log associated with the out-of-memory error is identified 104. A memory usage pattern associated with the process is identified 106. A root cause for the out-of-memory error is determined 108 in response to identifying the memory usage pattern associated with the process. A remedial action is performed 110 on the cloud computing environment in response to determining the root cause for the out-of-memory error.

In some implementations, automated memory issue locating process 10 generates 100 a list of out-of-memory errors associated with a cloud computing environment. For example, a cloud computing environment (e.g., cloud computing environment 200) is a virtual infrastructure that allows users to access and utilize computing resources such as servers, storage, databases, networking, software, and analytics over the internet, commonly referred to as "the cloud." These resources are hosted on remote servers and managed by cloud service providers (CSPs). Key characteristics of a cloud computing environment include on-demand self-service, where users can provision and manage computing resources as needed without requiring human intervention from the service provider, and broad network access, which ensures resources are accessible over the internet from various devices, including laptops, smartphones, and tablets.

Additionally, resource pooling allows computing resources to be dynamically assigned and reassigned based on demand, serving multiple users efficiently. Rapid elasticity enables resources to be quickly scaled up or down to meet varying workload demands, providing flexibility and efficiency. Measured service ensures cloud services are metered, and users pay only for what they use, similar to utility billing. The multi-tenancy feature allows multiple customers to share the same infrastructure while their data remains isolated and secure.

In some implementations, computing devices (e.g., computing devices 202, 204, 206) within cloud computing environment 200 can execute processes (e.g., processes 208, 210, 212, 214 on computing device 204 and processes 216, 218, 220, 222 on computing device 206) experience out-of-memory errors (i.e., a state of computing device operation where no additional memory can be allocated for use by processes). Computing devices 202, 204, 206 generate logs of these out-of-memory errors (among other issues during the operation of the computing devices) for subsequent analysis. However, identifying the most relevant log content is crucial for the efficacy of diagnostic analyses. Given the typically noisy and voluminous nature of log data, conducting complex analyses swiftly is impractical if all logs associated with out-of-memory incidents are considered. Random selection of logs is equally ineffective, as log data across different hosts can exhibit a wide range of variability. For the same memory leak bug, manifestations can differ significantly from one computing device to another. Consequently, automated memory issue locating process 10 involves selecting a candidate set of logs where the problematic allocations occur with higher frequency.

In some implementations, generating 100 the list of out-of-memory errors associated with the cloud computing environment includes identifying 112 a suspected computing device from a plurality of computing devices within the cloud computing environment based upon, at least in part, at least one of: frequency of out-of-memory errors associated with each computing device; and timing of the out-of-memory errors associated with each computing device. Automated memory issue locating process 10 begins this selection process by identifying a suspected list of computing devices. For example, automated memory issue locating process 10 searches kernel logs for the presence of a keyword (i.e., "oom-killer" or other predefined keyword associated with an out-of-memory error) during a time frame of an out-of-memory incident. In some implementations, automated memory issue locating process 10 identifies 112 a suspected computing device from which logs are added to the list of out-of-memory errors based on various factors. In one example, automated memory issue locating process 10 identifies 112 suspected computing devices (from which logs are added to the list of out-of-memory errors) based upon the frequency of out-of-memory errors (i.e., by identifying the computing device(s) that have encountered out-of-memory errors more frequently than other computing devices). In another example, automated memory issue locating process 10 identifies 112 suspected computing devices (from which logs are added to the list of out-of-memory errors) based upon the timing of out-of-memory errors (i.e., by identifying the computing device(s) that have experienced out-of-memory errors within a predefined time period). In another example, automated memory issue locating process 10 identifies 112 the computing devices (from which logs are added to the list of out-of-memory errors) based upon the noisiness of the logs of the computing device (i.e., by identifying a computing device with a clearer error pattern). In some implementations, this filtering process identifies computing device(s) that include information related to out-of-memory errors.

In some implementations, automated memory issue locating process 10 identifies 102 a log associated with an out-of-memory error. For example, the list of out-of-memory errors (e.g., list of out-of-memory errors 224) includes a reference to each computing device with out-of-memory errors. As discussed above, automated memory issue locating process 10 identifies 112 suspected computing devices that are added to the list of out-of-memory errors. From list of out-of-memory errors 224, automated memory issue locating process 10 identifies various logs (e.g., logs 226) associated with the out-of-memory errors. In some implementations, logs 226 include kernel logs that record messages about computing devices, including the kernel, services, and applications running on the computing device. In one example, automated memory issue locating process 10 identifies a log (e.g., log 228) associated with an out-of-memory error. As discussed above, automated memory issue locating process 10 identifies 102 log 226 from a plurality of logs based on the computing device from which log 228 is generated. For example, a log from a suspected computing device that experiences frequent out-of-memory errors is identified 102 before logs from a suspected computing device with less frequent out-of-memory errors. In another example, a log from a suspected computing device that is generated within a predefined window of time as the out-of-memory error is identified 102 before logs from suspected computing device that are generated outside of the predefined window of time.

In some implementations, automated memory issue locating process 10 identifies 104 a process from the log associated with the out-of-memory error. For example, a process (e.g., process 208) is a program or other instruction set that performs operations within a computing device. Using the details of log 228, automated memory issue locating process 10 identifies 104 a process from the log that is associated with the out-of-memory error. In one example, log 228 includes multiple processes (e.g., processes 208, 210, 212, 222). In this example, process 208 is referenced by log 228 as occurring during the time of the out-of-memory error; process 210 is executed before the out-of-memory error and causes process 212 to be executed subsequently; and process 222 is part of a group of processes (e.g., processes 218, 220, 222) that are executed together. As will be discussed in greater detail below, the relationships among processes described in log 228 may influence the actual root cause for an out-of-memory error. These relationships are analyzed by automated memory issue locating process 10 by identifying a memory usage pattern associated with the identified process(es).

In some implementations, automated memory issue locating process 10 identifies 106 a memory usage pattern associated with the process. For example, one of the challenges with diagnosing and resolving out-of-memory issues is the existence of noisy information that requires greater resource allocation (in terms of time and/or computing power) to map accurately memory allocation to specific processes. In some implementations, automated memory issue locating process 10 processes the identified logs (e.g., log 228) to identify 106 various memory usage patterns that represent causes of an out-of-memory error. As shown in FIG. 2, the logs are processed by a memory usage pattern detection system (e.g., memory usage pattern detection system 230). memory usage pattern detection system 230 is a hardware and/or software component that processes logs and their associated process(es) to identify 106 a particular memory usage pattern.

In some implementations, identifying 106 the memory usage pattern includes determining 114 that memory usage of the process has exceeded its individual limit. In this example, automated memory issue locating process 10 identifies 114 a memory usage pattern (e.g., memory usage pattern 232) in which a process's memory usage exceeds a predefined limitation and causes out-of-memory on itself.

In some implementations, identifying 106 the memory usage pattern includes determining 116 that the process is invoked by another process. In this example memory usage pattern (e.g., memory usage pattern 234), a particular process does not itself exceed a predefined memory limitation but invokes a child process such that the total memory of parent and child processes exceeds the predefined memory limitation. In this case, the child process would trigger the out-of-memory, but (as will be discussed in greater detail below) the parent process is the root cause.

In some implementations, identifying 106 the memory usage pattern includes determining 118 whether the process is within a group of processes that exceed a group memory limit. In this example memory usage pattern (e.g., memory usage pattern 236), multiple processes belong to a same group with a group memory limitation (e.g., multiple processes from a particular user or of a specific operation type). The processes do not individually exceed the group memory limitation, but the combination of all processes of the group of processes exceed the group memory limit. In this example, any process in the group can trigger the out-of-memory error.

In some implementations, automated memory issue locating process 10 determines 108 a root cause for the out-of-memory error in response to identifying the memory usage pattern associated with the process. For example, automated memory issue locating process 10 first identifies which process triggered an out-of-memory error, utilizing the identified log data. Automated memory issue locating process 10 determines whether a first memory usage pattern (i.e., whether the implicated process' memory usage has exceeded its individual limit) can be identified from the log. If so, the root cause is determined to be that the individual process exceeded the process' memory limit. However, if the process' own memory usage did not exceed its limit, automated memory issue locating process 10 determines whether a first memory usage pattern (i.e., whether the implicated process was invoked by another, parent process) can be identified from the log. If so, automated memory issue locating process 10 determines 108 the root cause for the out-of-memory error to be the invoking of the child process by the parent process.

However, if the out-of-memory error does not correspond to either memory usage pattern, automated memory issue locating process 10 examines the collective memory usage of all processes within a same group as the triggered process. In this example, an exceedance of the group's memory limit categorizes this group issue as the root cause for the out-of-memory error. In some implementations, determining 108 the root cause includes processing 120 a plurality of processes from the log with a trained generative artificial intelligence (AI) model to identify whether any of the plurality of processes are related to a common memory group. For example, a pattern match algorithm is generally ineffective in detecting whether a process is part of a group of processes (i.e., a common memory group) that exceeds a group memory limit. For example, relationships between processes are dynamically changing and may not be captured by a static usage pattern. Accordingly, automated memory issue locating process 10 processes 120 a plurality of processes from the log with a trained generative AI model (e.g., generative AI model 238) to analyze the log to find whether processes are related to same common memory group. A generative AI model (e.g., generative AI model 216) is configured to receive natural language prompts and/or example entries and/or contextual information concerning an incident to generate a response (i.e., queries to better understand the processes and/or to determine whether multiple processes are part of a common memory group). In some implementations, the generative AI model includes a Large Language Model (LLM). A LLM is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language. In addition, LLMs demonstrate considerable general knowledge and are able to "memorize" large quantities of facts during training. The trained generative AI model processes semantic information about each process' origins and relationships with other processes to determine whether processes are part of a common memory group. As discussed above, examples of common memory groups include processes associated with the same user of the cloud computing environment, processes associated with the same operation type, processes associated with the same application, etc. In this manner, automated memory issue locating process 10 processes 120 a plurality of processes from the log with trained generative AI model 238 to determine 108 a root cause for the out-of-memory error.

Referring again to FIG. 2 and continuing with the above example, suppose that automated memory issue locating process 10 generates 100 list of out-of-memory errors with three out-of-memory errors. In this example, suppose that automated memory issue locating process 10 identifies 106 a memory usage pattern (e.g., memory usage pattern 232) associated with process 208 where process 208 exceeds an individual memory limit. Accordingly, automated memory issue locating process 10 determines that process 208 is the root cause of the first out-of-memory error. For the second out-of-memory error, suppose that automated memory issue locating process 10 identifies 116 a memory usage pattern (e.g., memory usage pattern 234) associated with process 210 where process 212 does not exceed an individual memory limit but when invoked by a parent process (e.g., process 210), the memory limit is exceeded. Accordingly, automated memory issue locating process 10 determines that process 210 is the root cause of the second out-of-memory error by invoking process 212 that causes the combined memory limit to be exceeded. For the third out-of-memory error, suppose that automated memory issue locating process 10 identifies 118 a memory usage pattern (e.g., memory usage pattern 236) associated with process 222 where process 222 does not exceed an individual memory limit and is not invoked by a parent process but when combined with its common memory group (e.g., where the common memory group is defined as processes 218, 220, 222 as determined by generative AI model 238), the memory limit is exceeded. Accordingly, automated memory issue locating process 10 determines that process 222 is the root cause of the third out-of-memory error by exceeding a group memory limit associated with processes 218, 220, 222.

In some implementations, automated memory issue locating process 10 performs 110 a remedial action on the cloud computing environment in response to determining the root cause for the out-of-memory error. For example and as shown in FIG. 2, using the identified memory usage pattern (e.g., memory usage patterns 232, 234, 236), automated memory issue locating process 10 determines 108 a root cause for the out-of-memory error. In some implementations, automated memory issue locating process 10 generates a diagnostic report (e.g., diagnostic report 240) that indicates the root cause of a particular out-of-memory error. In one example, diagnostic report 240 is a description of the root cause provided to a user of cloud computing environment 200. In another example, diagnostic report 240 is provided to a computing device, generative AI model, or other non-user entity within (or out of) cloud computing environment 200. For example, a receiving computing device (e.g., computing device 204) can execute a remedial action based on diagnostic report 240. In another example, diagnostic report 240 is provided to a generative AI model as a prompt (or part of a prompt) to generate a recommendation to resolve future out-of-memory issues. In this manner, diagnostic report 240 can describe the root cause of an out-of-memory error and/or how to resolve the out-of-memory error.

In some implementations, performing 110 the remedial action on the cloud computing environment includes migrating 122 a process associated with the root cause for the out-of-memory error to a different computing device within the cloud computing environment. For example and as shown in FIG. 2, using diagnostic report 240 indicating that process 208 is the root cause of an out-of-memory error by exceeding an individual memory limit, automated memory issue locating process 10 migrates 122 process 208 to a different computing device (e.g., computing device 202) within cloud computing environment 200.

In some implementations, performing 110 the remedial action on the cloud computing environment includes preventing the execution of a process associated with the root cause for the out-of-memory error on a computing device within the cloud computing environment. For example and as shown in FIG. 3, using diagnostic report 240 indicating that process 210 is the root cause of an out-of-memory error by invoking a child process that exceeds the memory limit, automated memory issue locating process 10 prevents process 210 from being executed on computing device 204 within cloud computing environment 200. In this manner, the out-of-memory error associated with the invoking of a child process is prevented.

In one example implementation, automated memory issue locating process 10 expedites the diagnosis and resolution of out-of-memory errors by processing memory usage patterns and performing remedial actions as shown below in Tables 1-2. Table 1 describes four out-of-memory errors diagnosed using conventional approaches with the diagnosis time for each out-of-memory error while Table 2 describes three out-of-memory errors diagnosed using automated memory issue locating process 10 with the diagnosis time.

TABLE 1

| Related Process | Diagnosing time |
|---|---|
| Process1 | 5 days |
| Process2 | 4 days |
| Process3 | 1 day |

TABLE 2

| Related Process | Diagnosing time |
|---|---|
| Process4 | 6 hours |
| Process5 | 9 hours |
| Process6 | 7 hours |
| Process7 | 12 hours |

As shown above, automated memory issue locating process 10 reduces the diagnosing time for various processes from days to hours. Accordingly, automated memory issue locating process 10 provides automated diagnosis and resolution by performing remedial action(s) within the cloud computing environment to prevent further out-of-memory errors or mitigate the number and severity of future out-of-memory errors.

System Overview

Figure 4:
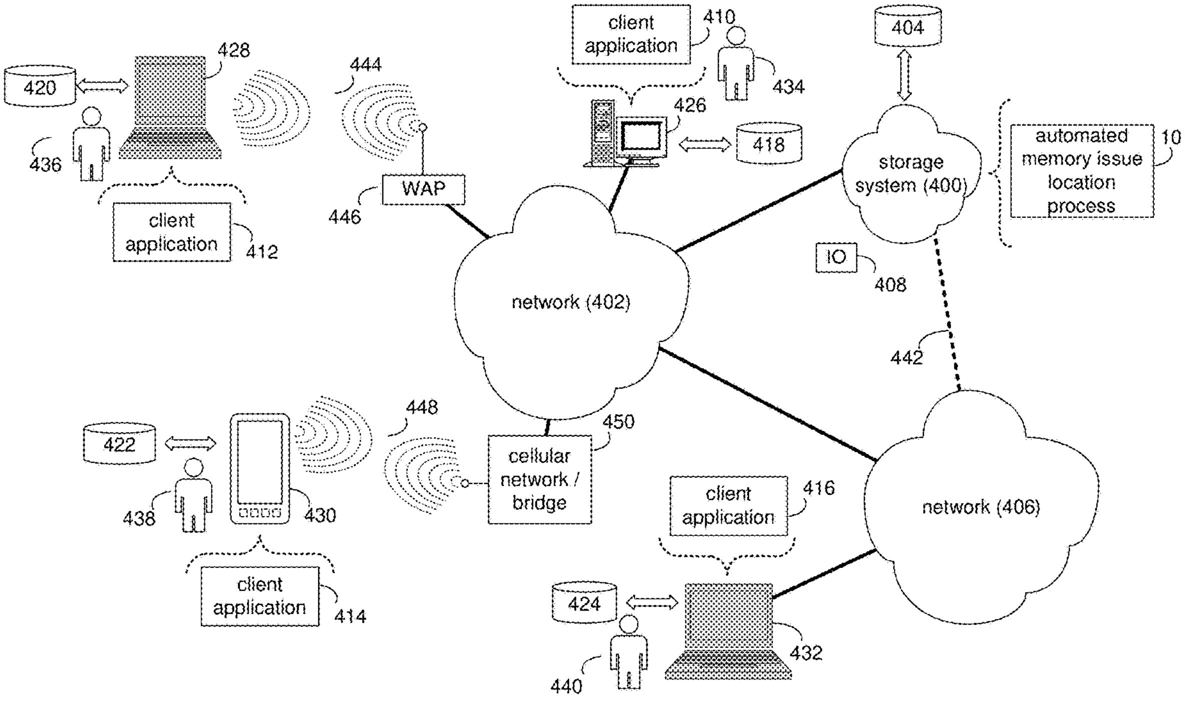
FIG. 4 is a diagrammatic view of computer system and an automated memory issue locating process coupled to a distributed computing network.

Referring to FIG. 4, an automated memory issue locating process 10 is shown to reside on and is executed by storage system 400, which is connected to network 402 (e.g., the Internet or a local area network). Examples of storage system 400 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of storage system 400 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of automated memory issue locating process 10, which are stored on storage device 404 included within storage system 400, are executed by one or more processors (not shown) and one or more memory architectures (not shown) included within storage system 400. Storage device 404 may include: a hard disk drive; an optical drive; a RAID device; a random-access memory (RAM); a read-only memory (ROM); and all forms of flash memory storage devices. Additionally or alternatively, some portions of the instruction sets and subroutines of automated memory issue locating process 10 are stored on storage devices (and/or executed by processors and memory architectures) that are external to storage system 400.

In some implementations, network 402 is connected to one or more secondary networks (e.g., network 406), examples of which include: a local area network; a wide area network; or an intranet.

Various input/output (IO) requests (e.g., IO request 408) are sent from client applications 410, 412, 414, 416 to storage system 400. Examples of IO request 408 include data write requests (e.g., a request that content be written to storage system 400) and data read requests (e.g., a request that content be read from storage system 400).

The instruction sets and subroutines of client applications 410, 412, 414, 416, which may be stored on storage devices 418, 420, 422, 424 (respectively) coupled to client electronic devices 426, 428, 430, 432 (respectively), may be executed by one or more processors (not shown) and one or more memory architectures (not shown) incorporated into client electronic devices 426, 428, 430, 432 (respectively). Storage devices 418, 420, 422, 424 may include: hard disk drives; tape drives; optical drives; RAID devices; random access memories (RAM); read-only memories (ROM), and all forms of flash memory storage devices. Examples of client electronic devices 426, 428, 430, 432 include personal computer 426, laptop computer 428, smartphone 430, laptop computer 432, a server (not shown), a data-enabled, and a dedicated network device (not shown). Client electronic devices 426, 428, 430, 432 each execute an operating system.

Users 434, 436, 438, 440 may access storage system 400 directly through network 402 or through secondary network 406. Further, storage system 400 may be connected to network 402 through secondary network 406, as illustrated with link line 442.

The various client electronic devices may be directly or indirectly coupled to network 402 (or network 406). For example, personal computer 426 is shown directly coupled to network 402 via a hardwired network connection. Further, laptop computer 432 is shown directly coupled to network 406 via a hardwired network connection. Laptop computer 428 is shown wirelessly coupled to network 402 via wireless communication channel 444 established between laptop computer 428 and wireless access point (e.g., WAP) 446, which is shown directly coupled to network 402. WAP 446 may be, for example, an IEEE 802.11a, 802.11b, 802.11g, 802.11n, Wi-Fi®, and/or Bluetooth® device that is capable of establishing a wireless communication channel 444 between laptop computer 428 and WAP 446. Smartphone 430 is shown wirelessly coupled to network 402 via wireless communication channel 448 established between smartphone 430 and cellular network/bridge 450, which is shown directly coupled to network 402.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

generating a list of out-of-memory errors associated with a cloud computing environment;

identifying a log associated with an out-of-memory error;

identifying, from the log, a process that triggered the out-of-memory error, wherein memory usage of the process contributes at least partially to the out-of-memory error;

identifying a memory usage pattern associated with the process, wherein the memory usage pattern comprises an indication of a memory usage contribution of the process with respect to a memory limit, and wherein the memory usage pattern indicates whether the process is a standalone process, invoked by a parent process or part of a group of related processes;

in response to identifying the memory usage pattern associated with the process, determining a root cause for the out-of-memory error as one of: the process, a parent process that invoked the process, or a group of processes that included the process based on the memory usage pattern in response to identifying the memory usage pattern associated with the process; and performing a remedial action on the cloud computing environment in response to determining the root cause for the out-of-memory error.

2. The computer-implemented method of claim 1, wherein generating the list of out-of-memory errors associated with the cloud computing environment comprises identifying a suspected computing device from a plurality of computing devices within the cloud computing environment based upon, at least in part, at least one of:

frequency of out-of-memory errors associated with each computing device; and timing of the out-of-memory errors associated with each computing device.

3. The computer-implemented method of claim 1, wherein identifying the memory usage pattern comprises determining whether the process is within a group of processes that exceed a group memory limit.

4. The computer-implemented method of claim 1, wherein determining the root cause comprises processing a plurality of processes from the log with a trained generative artificial intelligence (AI) model to identify whether any of the plurality of processes are related to a common memory group.

5. The computer-implemented method of claim 1, wherein performing the remedial action on the cloud computing environment comprises migrating a process associated with the root cause for the out-of-memory error to a different computing device within the cloud computing environment.

6. A computing system comprising:

a memory; and a processor operatively coupled to the memory, the processor configured to:

generate out-of-memory errors associated with a cloud computing environment, identify a log associated with an out-of-memory error by executing a query to a computing device within the cloud computing environment for obtaining the log, identify, from the log, a process that triggered the out-of-memory error, wherein memory usage of the process contributes at least partially to the out-of-memory error;

identify a memory usage pattern associated with the process, wherein the memory usage pattern comprises an indication of a memory usage contribution of the process with respect to a memory limit, and wherein the memory usage pattern indicates whether the process is a standalone process, invoked by a parent process, or part of a group of related processes;

in response to identifying the memory usage pattern associated with the process, determine a root cause for the out-of-memory error as one of: the process, a parent process that invoked the process, or a group of processes that included the process based on the memory usage pattern; in response to identifying the memory usage pattern associated with the process, and perform a remedial action on the cloud computing environment in response to determining the root cause for the out-of-memory error.

7. The computing system of claim 6, wherein the processor is further configured to identify a suspected computing device from a plurality of computing devices within the cloud computing environment based upon, at least in part, at least one of:

frequency of out-of-memory errors associated with each computing device; and timing of the out-of-memory errors associated with each computing device.

8. The computing system of claim 6, wherein to identify the memory usage pattern the processor is configured to determine whether the process is within a group of processes that exceed a group memory limit.

9. The computing system of claim 6, wherein to determine the root cause the processor is configured to assess a plurality of processes from the log with a trained generative artificial intelligence (AI) model to identify whether any of the plurality of processes are related to a common memory group.

10. The computing system of claim 6, wherein to perform the remedial action on the cloud computing environment the processor is configured to migrate a process associated with the root cause for the out-of-memory error to a different computing device within the cloud computing environment.

11. A non-transitory computer readable medium having instructions stored thereon which, when executed by a processor, cause the processor to:

generate a list of out-of-memory errors associated with a cloud computing environment;

identify a log associated with an out-of-memory error;

identify a process from the log that triggered the out-of-memory error, wherein memory usage of the process contributes at least partially to the out-of-memory error;

identify a memory usage pattern associated with the process, wherein the memory usage pattern comprises an indication of a memory usage contribution of the process with respect to a memory limit, and wherein the memory usage pattern indicates whether the process is a standalone process, invoked by a parent process, or part of a group of related processes;

in response to identifying the memory usage pattern associated with the process, determine a root cause for the out-of-memory error as one of: the process, a parent process that invoked the process, or a group of processes that included the process based on the memory usage pattern;

and migrate a process associated with the root cause for the out-of-memory error to a different computing device within the cloud computing environment.

12. The non-transitory computer readable medium of claim 11, wherein to generate the list of out-of-memory errors associated with the cloud computing environment the processor is further to identify a suspected computing device from a plurality of computing devices within the cloud computing environment based upon, at least in part, at least one of:

frequency of out-of-memory errors associated with each computing device; and timing of the out-of-memory errors associated with each computing device.

13. The non-transitory computer readable medium of claim 11, wherein to identify the memory usage pattern the processor is further to determine whether the process is within a group of processes that exceed a group memory limit.

14. The non-transitory computer readable medium of claim 11, wherein to determine the root cause the processor is further to assess a plurality of processes from the log with a trained generative artificial intelligence (AI) model to identify whether any of the plurality of processes are related to a common memory group.

* * * * *